(12) United States Patent
Wada

(10) Patent No.: US 8,725,968 B2
(45) Date of Patent: May 13, 2014

(54) STORAGE SECTION CONTROLLING APPARATUS, STORAGE SECTION CONTROLLING SYSTEM AND COMPUTER-READABLE RECORDING MEDIUM ON OR IN WHICH STORAGE SECTION CONTROLLING PROGRAM IS RECORDED

(75) Inventor: Mihoko Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 332 days.

(21) Appl. No.: 12/686,493

(22) Filed: Jan. 13, 2010

(65) Prior Publication Data

US 2010/0115219 A1    May 6, 2010

Related U.S. Application Data

(63) Continuation of application No. PCT/JP2007/064667, filed on Jul. 26, 2007.

(51) Int. Cl.
*G06F 12/00* (2006.01)
*G06F 13/00* (2006.01)
*G06F 13/28* (2006.01)

(52) U.S. Cl.
USPC .......................................... 711/162; 711/158

(58) Field of Classification Search
None
See application file for complete search history.

(56) References Cited

U.S. PATENT DOCUMENTS

| 7,055,057 B2 | 5/2006 | Achiwa | |
| 7,111,139 B2 * | 9/2006 | Osaki | 711/162 |
| 2006/0047998 A1 * | 3/2006 | Darcy | 714/6 |
| 2008/0270678 A1 * | 10/2008 | Cornwell et al. | 711/103 |

FOREIGN PATENT DOCUMENTS

| JP | 11-345096 | 12/1999 |
| JP | 2000-163222 | 6/2000 |
| JP | 2005-165618 | 6/2005 |
| JP | 2005-209055 | 8/2005 |
| JP | 2005-301976 | 10/2005 |

OTHER PUBLICATIONS

English language International Search Report for PCT/JP2007/064667, mailed Oct. 2, 2007.

* cited by examiner

*Primary Examiner* — Reginald Bragdon
*Assistant Examiner* — Stella Eun
(74) *Attorney, Agent, or Firm* — Staas & Halsey LLP

(57) ABSTRACT

A storage section controlling apparatus includes a queuing section adapted to retain a processing order of write requests and readout requests from a data processing apparatus to plural storage sections to, and a processing order controlling section adapted to change, where a readout request for a target region of a duplexing process of a second storage section of the plural storage sections by a duplexing controlling section is issued from the data processing apparatus and a write request for a target region of at least one first storage section of the plural storage sections of a copying source corresponding to the target region of the readout request exists later than a processing turn of the readout request in a processing order in the queuing section, the processing turn of the readout request in the processing order so as to be later than the writing request in the processing order.

14 Claims, 8 Drawing Sheets

--Related Art--

STORAGE SECTION CONTROLLING APPARATUS, STORAGE SECTION CONTROLLING SYSTEM AND COMPUTER-READABLE RECORDING MEDIUM ON OR IN WHICH STORAGE SECTION CONTROLLING PROGRAM IS RECORDED

CROSS-REFERENCE TO RELATED APPLICATION

This application is a continuation application of a PCT international application No. PCT/JP2007/064667 filed on Jul. 26, 2007 in Japan, the entire contents of which are incorporated by reference.

FIELD

The embodiments discussed herein are related to a technique for executing a processing request to a storage section of a copying destination in duplexing of data in an information processing system for carrying out duplexing of data between a plurality of storage sections.

BACKGROUND

Conventionally, a technique is available wherein, for example, duplexing (synthesis; Equivalent Copy) of data is carried out among a plurality of storage sections 101 to 104 in such a storage section controlling system 100 as illustrated in FIG. 8.
a host 105 for processing data stored in the storage sections (storage apparatus; disks) 101 to 104 as a processing target, a storage section controlling apparatus [given as "CM (Centralized Module)" in FIG. 8] 110 for carrying out processing for the storage sections 101 and 102 in accordance with an access request (reading/writing request) from the host 105, another storage section controlling apparatus (given as "CM" in FIG. 8) 120 for carrying out processing for the storage sections 103 and 104 in accordance with an access request from the host 105, channel adapters [given as "CA (Channel Adapter)" in FIG. 8] 113a and 113b for carrying out interface control between the host 105 and the storage section controlling apparatus 110, channel adapters (given as "CA" in FIG. 8) 123a and 123b for carrying out interface control between the host 105 and the storage section controlling apparatus 120, fibre channels [given as "FC (Fibre Channel)" in FIG. 8] 114a and 114b for carrying out interface control between the storage section controlling apparatus 110 and the storage sections 101 and 102, and fibre channels (given as "FC" in FIG. 8) 124a and 124b for carrying out interface control between the storage section controlling apparatus 120 and the storage sections 103 and 104.

It is to be noted that the storage section controlling apparatus 110 and 120 include CPUs (Central Processing Units) 111 and 121 for executing data processing, and caches 112 and 122, respectively. Further, a storage apparatus 106 is configured from the storage section controlling apparatus 110 and 120, CAs 113a, 113b, 123a and 123b, FCs 114a, 114b, 124a and 124b and storage sections 101 to 104.

Then, in the storage section controlling system 100, the storage section controlling apparatus 110 and 120 cooperate with each other to copy data in a predetermined region of the storage section 102 into the storage section 103 to duplex the data in the predetermined region.

In particular, the storage section controlling apparatus 110 and 120 execute data copy in the predetermined region of the storage section 102 and copy the data of the storage section 102 which is a copying source into the storage section 103 which is a copying destination to maintain the data in the predetermined region in a duplexed state.

Therefore, the storage section controlling system 100 is configured such that, while the storage section 102 and the storage section controlling apparatus 110 function as a master side, the storage section 103 and the storage section controlling apparatus 120 function as a slave side. Further, while the host 105 transmits a reading (readout) request of data to both of the storage section controlling apparatus 110 and 120 such that the storage sections 102 and 103 are taken as targets, a writing request is transmitted only to the storage section controlling apparatus 110 such that the storage section 102 is taken as a target.

In the storage section controlling system 100, within a period after data copying is started until copying of data of all target regions is completed to enter a duplexed state at an initial stage for implementing duplexing, readout of data from a data storage region (volume) of the storage section 103 as a copying destination is inhibited because the data is not guaranteed.

For example, even if a readout request for a duplexing target region of the storage section 102 is issued from the host 105 before duplexing is completed, there is no guarantee that duplexed data can be read out. Therefore, the storage section controlling apparatus 120 is configured such that it sends back an error response to the host 105 or takes some other countermeasure to suppress a data readout process for the storage section 103 from the storage section controlling apparatus 120.

Accordingly, the user or the like of the host 105 cannot read out data from the storage section 103 which is a copying destination before duplexing is completed, and this is inconvenient.

It is to be noted that a technique (remote copying) is conventionally available wherein duplication of data in a storage region which is a duplication source is managed also in another storage region which is a duplication destination upon restoration of a storage system from a disaster, and another technique is available wherein, if a readout request is issued to a duplication destination in which duplication is not completed as yet during such remote duplication, then data corresponding to the readout request is requested to a duplication source and the readout request is dealt with after the data is received (for example, refer to Patent Document 1).
Patent Document 1: Japanese Laid-Open Patent Publication No. 2005-165618

In the conventional storage section controlling system 100 described above with reference to FIG. 8, it is preferable to execute a readout request for data duplicated in the storage section 103 which is a copying destination based on the latest data of the storage section 102 which is a copying source commonly before and after completion of duplexing.

For example, when a readout request for the storage section 103 is issued, if an updating process of corresponding data (source data) of the storage section 102 corresponding to the readout request is being carried out, then it is preferable to read out the data after updated.

In the storage section controlling system 100, a processing order of reading/writing requests from the host 105 at least for the storage sections 102 and 103 which are duplexing targets of data is managed with a queuing table (not illustrated). Accordingly, if an updating process of the source data is registered already in the queuing table, then it is desirable to use the data after the updating process for a response to the readout request for the storage section 103.

However, in the conventional storage section controlling system 100, even if an updating process (writing process) for source data during execution (during queuing) exists, data after the updating process cannot be used for a response to a readout request for a copying destination.

SUMMARY

According to an aspect of the embodiment, there is provided a storage section controlling apparatus interposed between at least one first storage section of plural storage sections, which store data, and at least one data processing apparatus that carries out processing for the data stored in the plural storage sections, for carrying out processing for the at least one first storage section in response to a processing request from the data processing apparatus, comprising a duplexing controlling section adapted to copy data in a predetermined storage region of the at least one first storage section into a second storage section of the plural storage sections to maintain the data in the predetermined storage region in a duplexed state, a queuing section adapted to retain a processing order of write requests and readout requests from the data processing apparatus to the plural storage sections, and a processing order controlling section adapted to change, where a readout request for a region of the second storage section which is a target of a duplexing process by the duplexing controlling section is issued from the data processing apparatus and the processing order in the queuing section includes, later than a processing turn of the readout request, a write request for a target region of the at least one first storage section which corresponds to the target region of the readout request, the processing turn of the readout request in the processing order of the queuing section so as to be later than the write request in the processing order.

According to another aspect of the embodiment, there is provided a storage section controlling system, comprising plural storage sections adapted to store data, at least one data processing apparatus adapted to carry out processing for the data stored in the plural storage sections, and a first storage section controlling apparatus interposed between at least one first storage section of the plural storage sections and the data processing apparatus and adapted to carry out processing for the at least one first storage section in response to a processing request from the data processing apparatus, and wherein the first storage section controlling apparatus includes a duplexing controlling section adapted to copy data in a predetermined storage region of the at least one first storage section into a second storage section of the plural storage sections to maintain the data in the predetermined storage region in a duplexed state, a queuing section adapted to retain a processing order of write requests and data readout requests for the plural storage sections from the data processing apparatus, and a processing order controlling section adapted to change, where a readout request for a region of the second storage section which is a target of a duplexing process by the duplexing controlling section is issued from the data processing apparatus and the processing order in the queuing section includes, later than a processing turn of the readout request, a write request for a target region of the at least one first storage section which corresponds to the target region of the readout request, the processing turn of the readout request in the processing order of the queuing section so as to be later than the write request in the processing order.

According to a further aspect of the embodiment, there is provided a computer-readable recording medium on or in which a storage section controlling program for causing a computer to implement a function for executing a readout request for data of a duplexing object in a storage section controlling system including plural storage sections adapted to store data, at least one data processing apparatus adapted to carry out processing for the data stored in the plural storage sections, and a first storage section controlling apparatus interposed between at least one first storage section of the plural storage sections and the data processing apparatus and including a queuing section adapted to retain a processing order of write requests and readout requests for the plural storage sections from the data processing apparatus, the first storage section controlling apparatus carrying out processing for the at least one first storage section in response to a processing request from the data processing apparatus, is recorded, the storage section controlling program causing the computer to function such that the first storage section controlling apparatus functions as a duplexing controlling section adapted to copy data in a predetermined storage region of the at least one first storage section into a second storage section of the plural storage sections to maintain the data in the predetermined storage region in a duplexed state, a queuing section adapted to retain a processing order of write requests and readout requests from the data processing apparatus to the plural storage sections, and a processing order controlling section adapted to change, where a readout request for a region of the second storage section which is a target of a duplexing process by the duplexing controlling section is issued from the data processing apparatus and the processing order in the queuing section includes, later than a processing turn of the readout request, a write request for a target region of the at least one first storage section which corresponds to the target region of the readout request, the processing turn of the readout request in the processing order of the queuing section so as to be later than the write request in the processing order.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, an embodiment is described with reference to the drawings.

[1] Embodiment

Figure 1:
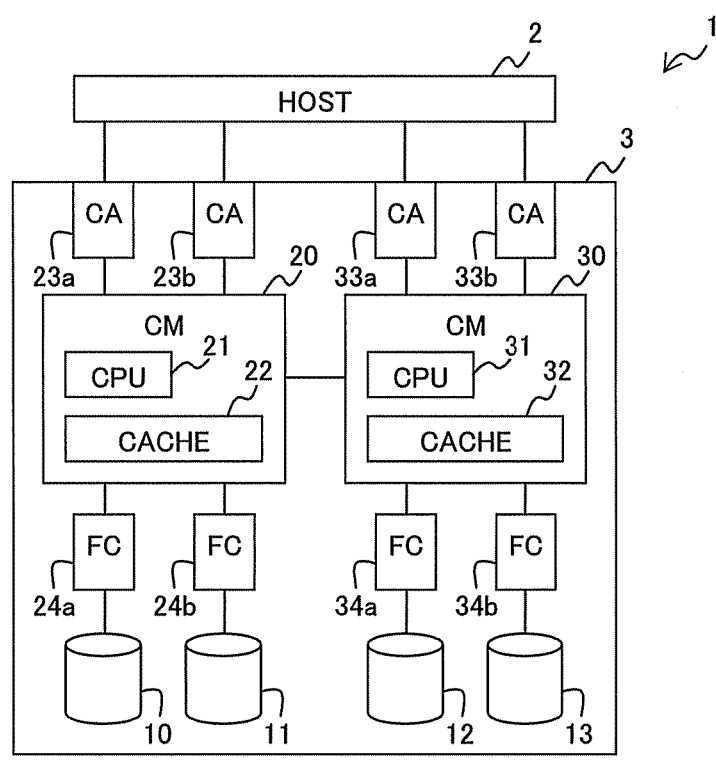
FIG. 1 is a block diagram illustrating a configuration of a storage section controlling system as an embodiment.

First, a configuration of a storage section controlling system (hereinafter referred to as present storage section controlling system) 1 as an embodiment is described with reference to a block diagram illustrated in FIG. 1. The present storage section controlling system 1 is configured from a host (data processing apparatus) 2 and a storage apparatus 3.

The host 2 issues a processing request to the storage apparatus 3 and issues a writing request (writing request) or a readout request (reading request) to disks (storage sections) 10 to 13 hereinafter described.

The storage apparatus 3 includes the disks 10 to 13, CMs (Centralized Modules; storage section controlling apparatus) 20 and 30, CAs (Channel Adapters) 23a, 23b, 33a and 33b, and FCs (Fibre Channels) 24a, 24b, 34a and 34b. It is to be noted that the CM 20 functions as a first storage section controlling apparatus and the CM 30 functions as a second storage section controlling apparatus.

The disks 10 to 13 are storage sections for storing data. It is to be noted that data of the disk 11 are copied on the disk 12 by a duplexing controlling section 25 (refer to FIG. 2 hereinafter described) hereinafter described.

The CMs 20 and 30 carry out processing for the disks 10 to 13 in accordance with a processing request from the host 2, and here the CM 20 carries out processing for the disks 10 and 11 while the CM 30 carries out processing for the disks 12 and 13.

The CM 20 includes a CPU (Central Processing Unit) 21 for carrying out a writing process, a readout process and so forth for the disks 10 and 11, and a cache 22 as a primary memory.

Further, similarly to the CM 20, also the CM 30 includes a CPU 31 for carrying out a writing process, a readout process and so forth for the disks 12 and 13, and a cache 32.

It is to be noted that the CM 20 and the CM 30 are connected to each other so that they can transmit and receive information to and from each other.

The CAs 23a and 23b function as interface controlling sections between the host 2 and the CM 20, and the CAs 33a and 33b function as interface controlling sections between the host 2 and the CM 30.

The FCs 24a and 24b function as interface controlling sections between the disks 10 and 11 and the CM 20, and the FCs 34a and 34b function as interface controlling sections between the disks 12 and 13 and the CM 30.

In this manner, the CM 20 is interposed between the host 2 and the disks 10 and 11 through the CAs 23a and 23b and the FCs 24a and 24b.

Accordingly, reading/writing requests from the host 2 are transmitted to the CPU 21 of the CM 20 through the CAs 23a and 23b, and a response from the CPU 21 is transmitted to the host 2 through the CAs 23a and 23b.

Further, transfer of information between the CPU 21 and the disk 10 is carried out through the FC 24a, and transfer of information between the CPU 21 and the disk 11 is carried out through the FC 24b.

The CM 30 is interposed between the host 2 and the disks 12 and 13 through the CAs 33a and 33b and the FCs 34a and 34b.

Accordingly, reading/writing requests from the host 2 are sent to the CPU 31 of the CM 30 through the CAs 33a and 33b, and a response from the CPU 31 is sent to the host 2 through the CAs 33a and 33b.

Further, transfer of information between the CPU 31 and the disk 12 is carried out through the FC 34a, and transfer of information between the CPU 31 and the disk 13 is carried out through the FC 34b.

Figure 2:
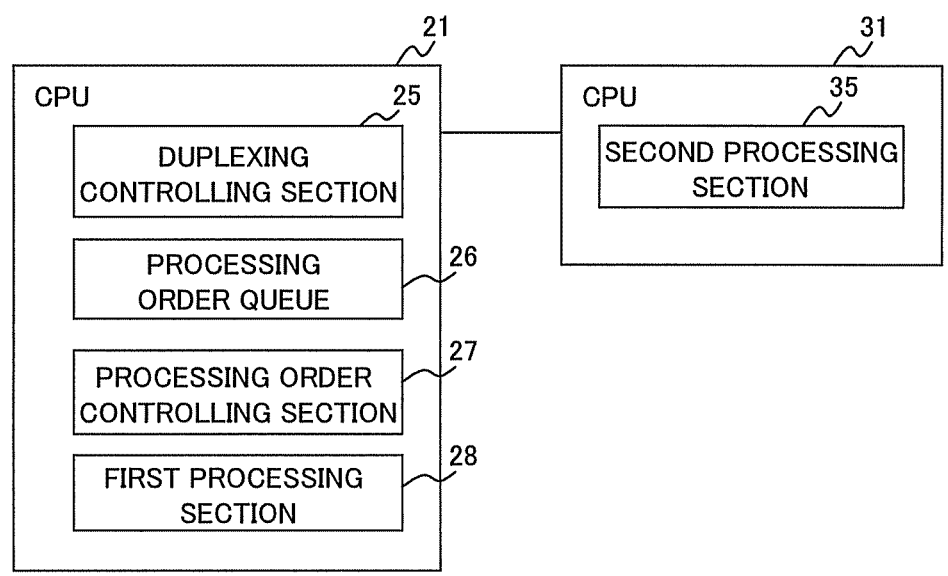
FIG. 2 is a block diagram illustrating a functional configuration of a CPU in a CM of a storage apparatus of the storage section controlling system as the embodiment.

Now, detailed functions of the CPU 21 of the CM 20 and the CPU 31 of the CM 30 are described with reference to FIG. 2.

The CPU 21 includes a duplexing controlling section 25, a processing order queue (queuing section) 26, a processing order controlling section 27 and a first processing section 28. It is to be noted that the duplexing controlling section 25, processing order controlling section 27 and first processing section 28 are implemented by the CPU 21 executing a predetermined application program (for example, a storage section controlling program hereinafter described).

The duplexing controlling section 25 copies data in a predetermined storage region (here, all regions of the disk 11; designated copy range (refer to FIG. 3 hereinafter described)) of the disk 11 on the disk 12 in accordance with an instruction from the host 2 to maintain the data of the disk 11 in a duplexed state.

If an instruction for duplexing is received from the host 2, then the duplexing controlling section 25 starts copying from the disk 11 as a copying source on the disk 12 as a copying destination, and, after copying of the all regions of the disk 11 is completed and transition of data into a duplexed state is completed, data updated every time the data of the disk 11 is updated is copied on the disk 12 in order to maintain the duplexing of data between the disks 11 and 12.

It is to be noted that, in the present storage section controlling system 1, even before the duplexing process of the duplexing controlling section 25 is completed, the host 2 issues a request for readout of data of a duplexing target or writing for a region of the disk 11 of a duplexing target and the CPUs 21 and 31 execute the request.

Accordingly, if a writing request for the disk 11 is issued before the duplexing is completed, the duplexing controlling section 25 copies data after the processing corresponding to the writing request on the disk 12.

Figure 3:
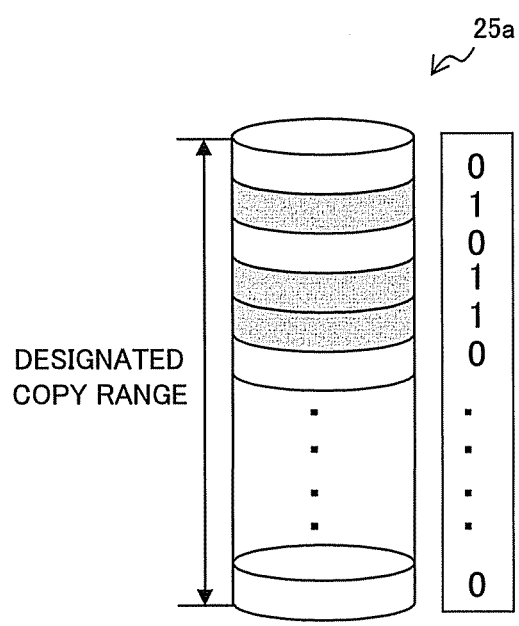
FIG. 3 is a view illustrating a configuration of a management table retained by a duplexing processing section of the CPU in the CM of the storage apparatus of the storage section controlling system as the embodiment.

Further, the duplexing controlling section 25 includes such a management table 25a as illustrated in FIG. 3 and registers a progress situation of the duplexing process into the management table 25a.

The management table 25a manages using a flag whether or not copying (in other words, duplication) of data is completed for every predetermined region (block) of a copying destination (or copying source). Here, "0" represents completion but "1" represents non-completion.

It is to be noted that the management table 25a and the processing order queue 26 are implemented, for example, by a memory (not illustrated) of the CPU 21.

The processing order queue 26 collectively retains processing turns in a processing order of reading/writing requests for the disks 10 to 13 issued from the host 2. In particular, the processing order queue 26 integrates reading/writing requests issued from the host 2 to the CPU 21 of the CM 20 and reading/writing requests issued from the host 2 to the CPU 31 of the CM 30 and retains processing turns of all reading/writing requests in the processing order.

It is to be noted that the reason why the processing order queue 26 integrates and retains not only the processing turns of the reading/writing requests of the CPU 21 (first processing section 28) in the processing order but also the processing turns of the reading/writing requests of the CPU 31 (second processing section 35) in the processing order is that it is intended to make it possible for the duplexing process by the duplexing controlling section 25 to be executed with certainty by variation of the processing order by the processing order controlling section 27. Accordingly, the processing order queue 26 may retain at least reading/writing requests for the disk 11 and a reading request for the disk 12.

It is to be noted that, in the present storage section controlling system 1, since the disk 11 functions as a master and the disk 12 functions as a slave as described above, the host 2 does not issue a writing request for the disk 12.

Where a readout request for a target region of the disk 12 which is a copying destination for duplexing is issued from the host 2 to the second processing section 35 of the CPU 31, if a writing request for a target region of the disk 11 of a copying source corresponding to the target region of the readout request exists later than the processing turn of the readout request in the processing order in the processing order queue 26, the processing order controlling section 27 changes the processing turn of the readout request in the processing order in the processing order queue 26 to a later turn than the writing request.

Figure 4:
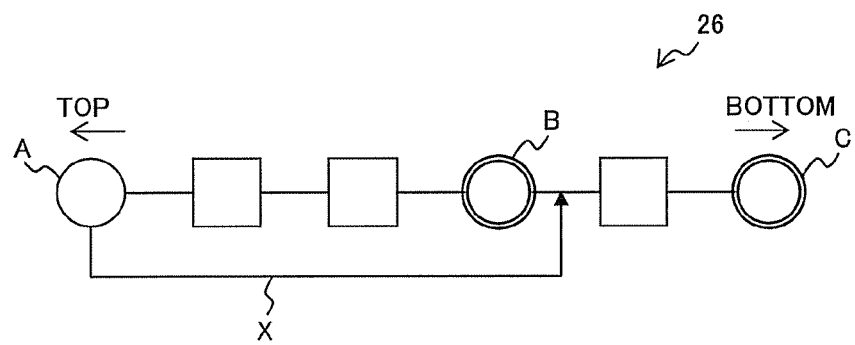
FIG. 4 is a view illustrating a configuration of a processing order queue of the CPU in the CM of the storage section controlling system as the embodiment.
Figure 4:
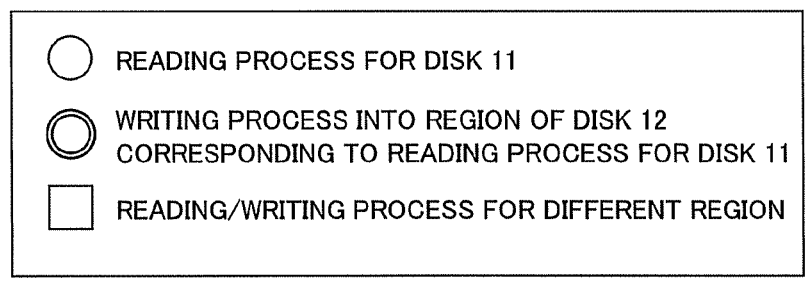

In particular, if there exists no process for a processing target range same as that of the readout request preceding to the readout request (reading process) A in the processing order queue 26 as illustrated in FIG. 4 [here, the processing turn becomes the top (indicated by "top" in FIG. 4)], the processing order controlling section 27 decides whether or not a writing request (in particular, a request for an updating process for source data with regard to data of the readout request; writing process) B for a target region of the disk 11 of a copying source corresponding to the readout request A exists.

Then, if the corresponding writing request B exists and the present time is within a range (response limit time) within which the host 2 does not detect timeout with regard to the readout request A, then the processing turn of the readout request A in the processing order is changed so as to be later than the writing request B (refer to an arrow mark X in FIG. 4).

It is to be noted that, while a writing request C for a target region of the disk 11 corresponding to the readout request A exists also at the tail end of the processing order (denoted by "bottom" in FIG. 4) in the example illustrated in FIG. 4, if there still remains time before the host 2 detects timeout when the readout request A whose processing turn is changed so as to be later than the writing request B comes to the top of the processing order, then the processing order controlling section 27 further changes the processing turn of the readout request A after the change in the processing order so as to be later than the writing request C.

The processing order controlling section 27 stores time at which the readout request A is retained into the processing order queue 26 as processing starting time. Then, when the processing turn of the readout request A in the processing order is changed (here, when the processing turn of the readout request A is changed to the top in the processing order), the processing order controlling section 27 determines a difference from the present time to calculate elapsed time from processing starting. Further, the processing order controlling section 27 decides based on the elapsed time whether or not timeout is detected by the host 2 even if the processing turn of the readout request A in the processing order is changed so as to be later than the corresponding writing requests B and C.

Then, the processing order controlling section 27 changes the processing order of the readout request A only where it is decided that timeout is not detected by the host 2 even if the processing turn of the readout request A in the processing order is changed.

In this manner, where the present time remains within predetermined time within which timeout is not detected by the host 2 even if the processing turn is changed after the readout request A is retained into the processing order queue 26, the processing order controlling section 27 changes the processing turn of the readout request A in the processing order so as to be later than the corresponding writing requests B and C. Accordingly, the latest data can be used for the readout request A while it is suppressed that timeout by the host 2 is detected.

The first processing section 28 carries out processing for the disks 10 and 11 in accordance with the reading/writing requests from the host 2 and executes processing based on the processing order retained in the processing order queue 26.

The CPU 31 includes a second processing section (processing section) 35. It is to be noted that the second processing section 35 is implemented by executing a predetermined application program (for example, a storage section controlling program hereinafter described) by the CPU 31.

The second processing section 35 carries out processing for the disks 12 and 13 in accordance with reading/writing requests from the host 2 and executes the processing based on the processing order retained in the processing order queue 26.

Further, when a readout request for the disk 11 which is a copying destination of the duplexing process is executed based on the processing order retained in the processing order queue 26, the second processing section 35 decides based on the management table 25a whether or not the duplexing process of data in a target region of the readout request by the duplexing controlling section 25 is completed.

Then, if the duplexing process of data according to a readout request is not completed and the pertaining data is not yet recorded (copied) on the disk 11, the second processing section 35 issues a request for a duplexing process of the pertaining data (in other words, a target region of the readout request) to the duplexing controlling section 25 to cause the duplexing controlling section 25 to copy the data in the target region according to the readout request from the disk 11 on the disk 12, whereafter the readout request is executed.

Figure 5:
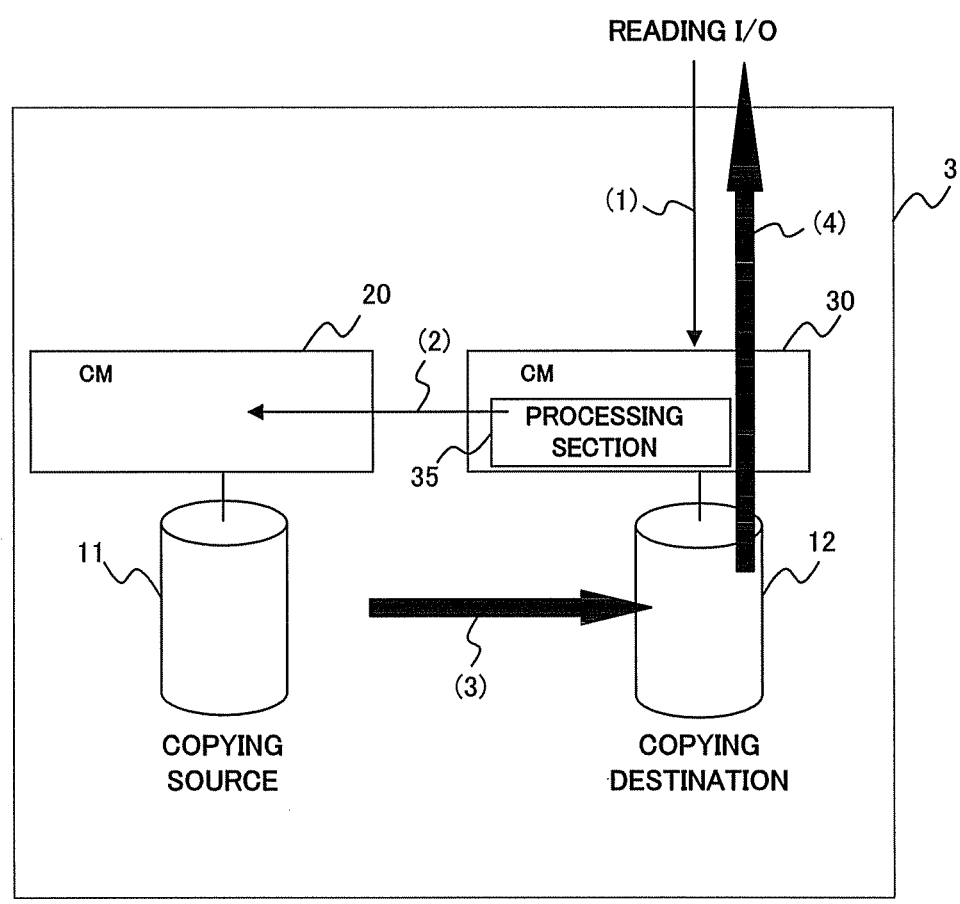
FIG. 5 is a view illustrating a function of a processing section of the CPU in the CM of the storage section controlling system as the embodiment.

In particular, if a readout request (denoted by "read I/O" in FIG. 5; refer to an arrow mark (1)) for the disk 12 is received from the host 2 as seen in FIG. 5, then the second processing section 35 decides based on the management table 25a whether or not data of a target region according to the readout request is recorded on the disk 12, that is, whether or not the duplexing process of the target region is completed.

It is to be noted that the second processing section 35 includes a table (not illustrated) which indicates presence or absence of duplexed data of the disk 12 (that is, whether or not the duplexing process is completed) and corresponds to the management table 25a, and may decide presence or absence of the data regarding the readout request based on the table.

Then, if the data regarding the readout request does not exist on the disk 12 and the duplexing process for the pertaining data is not completed as yet, then the second processing section 35 issues a copying request of the pertaining data (reading request range) to the duplexing controlling section 25 of the CM 20 (refer to an arrow mark (2) in FIG. 5).

If the request for data copying is received from the second processing section 35, then the duplexing controlling section 25 copies the target range from the disk 11 (copying source volume) of a copying source on the disk 12 (copying destination volume) of a copying destination (refer to an arrow mark (3) in FIG. 5).

If the copying of the data in the target range by the duplexing controlling section 25 is completed, then the second processing section 35 executes a readout process of the data to the host 2 (refer to an arrow mark (4) in FIG. 5).

It is to be noted that, if it is decided based on the management table 25a that the duplexing process of the data according to the readout request by the duplexing controlling section is completed, then the second processing section 35 executes the readout request.

Figure 6:
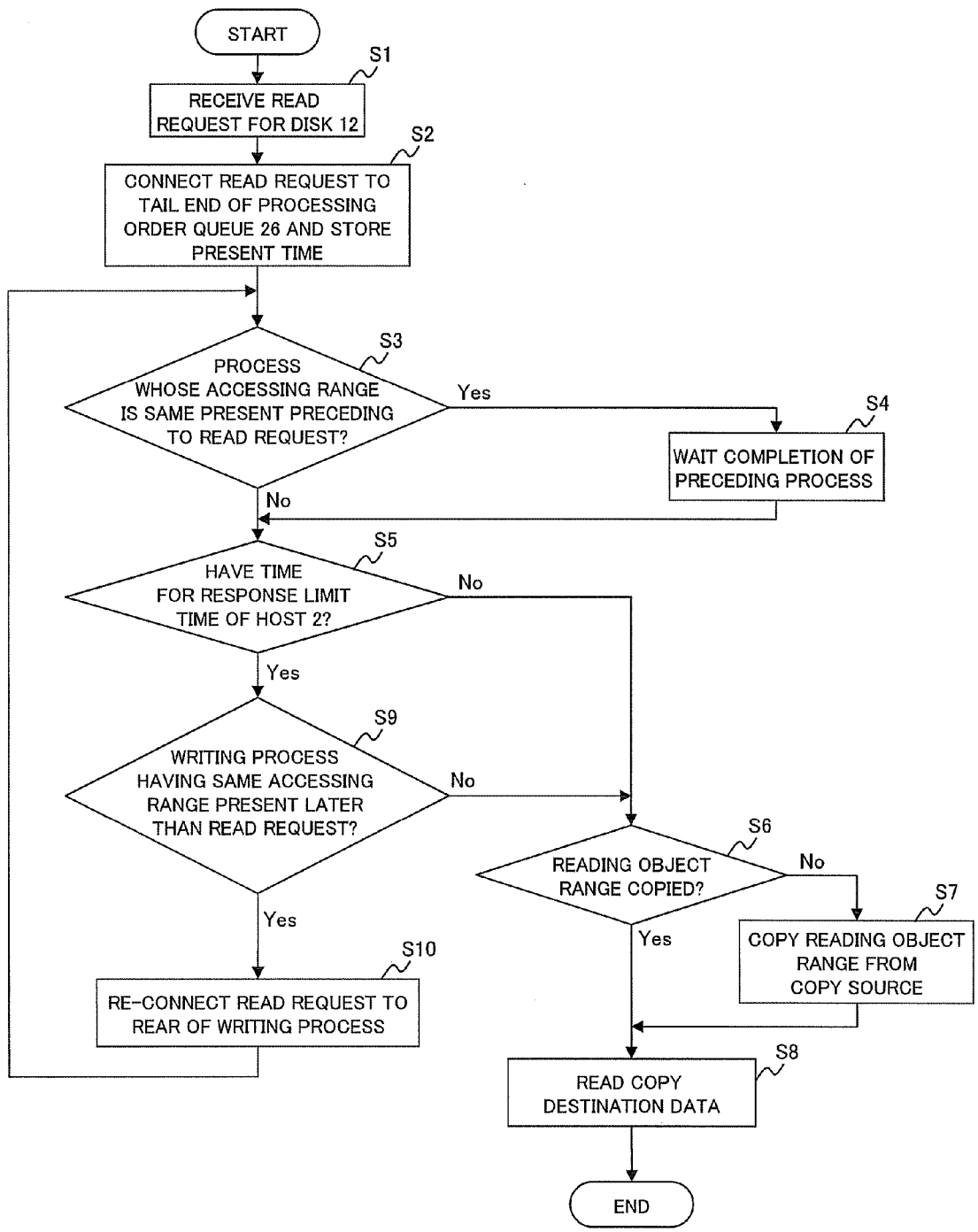
FIG. 6 is a flow chart illustrating an example of an operation procedure of the storage section controlling system as the embodiment.

Now, an operation procedure of the storage apparatus 3 where a readout request for the disk 12 which is a copying destination of the duplexing process is issued from the host 2 is described with reference to a flow chart (steps S1 to S10) illustrated in FIG. 6.

First, if a readout request for the disk 12 issued from the host 2 is received by the second processing section 35 of the CM 30 through the CA 33a or the CA 33b (step S1), then the second processing section 35 connects (registers) the readout request to the tail end of the processing order queue 26 and the processing order controlling section 27 stores time at which the readout request is connected to the tail end of the processing order queue 26 as processing starting time (step S2).

Then, the processing order controlling section 27 decides whether or not there exists a process having the same accessing range preceding to the pertaining readout request in the processing order queue 26 (step S3). Then, if it is decided by the processing order controlling section 27 that there exists a process having the same accessing range (Yes route at step S3), then the processing order controlling section 27 advances its processing to step S5 hereinafter described after the process is completed (step S4).

It is to be noted that, if it is decided by the processing order controlling section 27 that there exists no process having the same accessing range (No route at step S3), then the processing order controlling section 27 does not carry out the process at step S4 but advances the processing to step S5 hereinafter described.

In particular, if there exists no process having the same accessing range as that of the readout request, then the processing order controlling section 27 decides based on the processing starting time stored at step S2 whether or not there is time to spare for response limit time of the readout request (step S5).

In particular, the processing order controlling section 27 determines processing elapsed time of the readout request based on the present time and the processing starting time and decides whether or not there still remains time before the host 2 detects timeout (in other words, whether or not there is time to spare for changing of the processing turn of the readout request in the processing order).

Then, if it is decided that there is no time to spare for the response limit time of the host 2 (No route at step S5), then the processing order controlling section 27 does not carry out changing of the processing turn of the readout request in the processing order. Then, if the readout request comes to the top of the processing order queue 26, then the second processing section 35 starts processing of the readout request.

At this time, the second processing section 35 decides whether or not the readout target range of the readout request is copied (duplexed) already (step S6). If it is decided that the readout target range is not copied as yet (No route at step S6), then the second processing section 35 copies the readout target range of the readout request from the disk 11 of the copying source as described hereinabove with reference to FIG. 5 (step S7) and reads out copying destination data which is a target range of the readout request to the host 2 (step S8). Thereafter, the processing ends.

It is to be noted that the decision at step S6 includes not only decision regarding whether or not copying is not completed as yet at an initial stage of duplexing but also decision regarding whether or not copying of updated source data on the disk 12 is completed after duplexing is completed once.

Further, if it is decided that the target range of the readout request is copied already (Yes route at step S6), then the second processing section 35 reads out data regarding the readout request recorded on the disk 12 (step S8) and then ends the processing.

On the other hand, if it is decided at step S5 that there is time to spare for the response limit time of the host 2 (Yes route at step S5), the processing order controlling section 27 decides whether or not there exists a writing request (writing process) having the same accessing range later than the pertaining readout request in the processing order queue 26 (step S9).

Here, if it is decided that there is no writing request having the same accessing range later than the readout request (No route at step S9), then the processing order controlling section 27 advances the processing to step S6.

On the other hand, if it is decided that there exists a writing request having the same accessing range later than the readout request (Yes route at step S9), then the processing order controlling section 27 re-connects the processing turn of the readout request in the processing order in the processing order queue 26 to the next to the writing request (step S10). Then, the processing advances to step S3.

In this manner, with the storage section controlling system 1 as the embodiment, where a readout request for the disk 12 which is a copying destination of a duplexing process by the duplexing controlling section 25 is issued from the host 2, if there exists a writing request for a target region of the disk 11 of a copying source corresponding to a target region (accessing range) of the readout request later than the readout request in the processing order queue 26, then the processing order controlling section 27 changes the processing turn of the readout request in the processing order in the processing order queue 26 to a turn later than the writing request. Therefore, regarding a readout request for data (region) of a duplexing target on the disk 12 which is a copying destination of a duplexing process by the duplexing controlling section 25 from the host 2, if source data with regard to the data is scheduled to be updated, then a readout process can be carried out using data after the updating and response can be carried out normally using the latest data.

Further, if the present time is within predetermined time within which the readout request is retained into the processing order queue 26, then the processing order controlling section 27 changes the processing turn of the readout request in the processing order so as to be later than the corresponding writing request. Therefore, it is possible to suppress the host 2 from detecting timeout with regard to the readout request.

More particularly, the processing order controlling section 27 calculates elapsed time of the readout request based on the time at which the readout request is registered into the processing order queue 26 and the present time when the processing turn of the readout request in the processing order is to be changed, and decides based on the calculated elapsed time whether or not processing of the readout request can be carried out within response limit time of the host 2 even if the processing turn of the readout request in the processing order is changed and then changes the processing turn of the readout request in the processing order. Therefore, it can be suppressed with more certainty that the host 2 detects timeout with regard to the readout request.

Further, if the duplexing process of the data of the target region according to the readout request by the duplexing controlling section 25 is not completed as yet when the readout request is to be executed based on the processing turn in the processing order retained in the processing order queue 26, then the second processing section 35 of the CPU 31 of the CM 30 causes the duplexing controlling section 25 to copy the data of the target region from the disk 11 on the disk 12 and then executes the readout request. Therefore, even if a readout request is issued for a region whose duplexing between the disks 11 and 12 is not completed as yet after the duplexing controlling section 25 receives a duplexing instruction from the host, the readout request can be executed with certainty.

It is to be noted that, since the second processing section 35 decides based on the management table 25a whether or not a duplexing process of data of a target region according to the readout request is completed, presence or absence (in other words, whether or not copying has been carried out) of data on the disk 12 according to the readout request can be decided with certainty, and as a result, execution of the readout request can be carried out with a higher degree of certainty.

Further, after transition into a duplexed state of data of the disk 11 is completed, every time data in a duplexing target range (predetermined storage region) of the disk 11 is updated, the duplexing controlling section 25 copies the updated data on the disk 12 to maintain the duplexed state. Therefore, duplexing of data between the disks 11 and 12 can always be maintained.

[2] Others

The present invention is not limited to the embodiment specifically described above, and variations and modifications can be made without departing from the scope of the present invention.

For example, while, in the embodiment described above, a case wherein data of the disk 11 is duplicated on the disk 12 is taken as an example, the embodiment is not limited to this, and duplexing of data may be carried out between the disk 10 and the disk 11 both of which are controlled by the same CM 20. In this instance, the first processing section 28 of the CPU 21 of the CM 20 has also a function of the second processing section 35 of the CPU 31 of the CM 30 in the embodiment described above. In particular, while the embodiment is described hereinabove taking a case wherein the CM 30 includes the second processing section 35 as an example, if duplexing of data between the disks 10 and 11 is intended, then the CM 20 includes a function of the second processing section 35.

Figure 7:
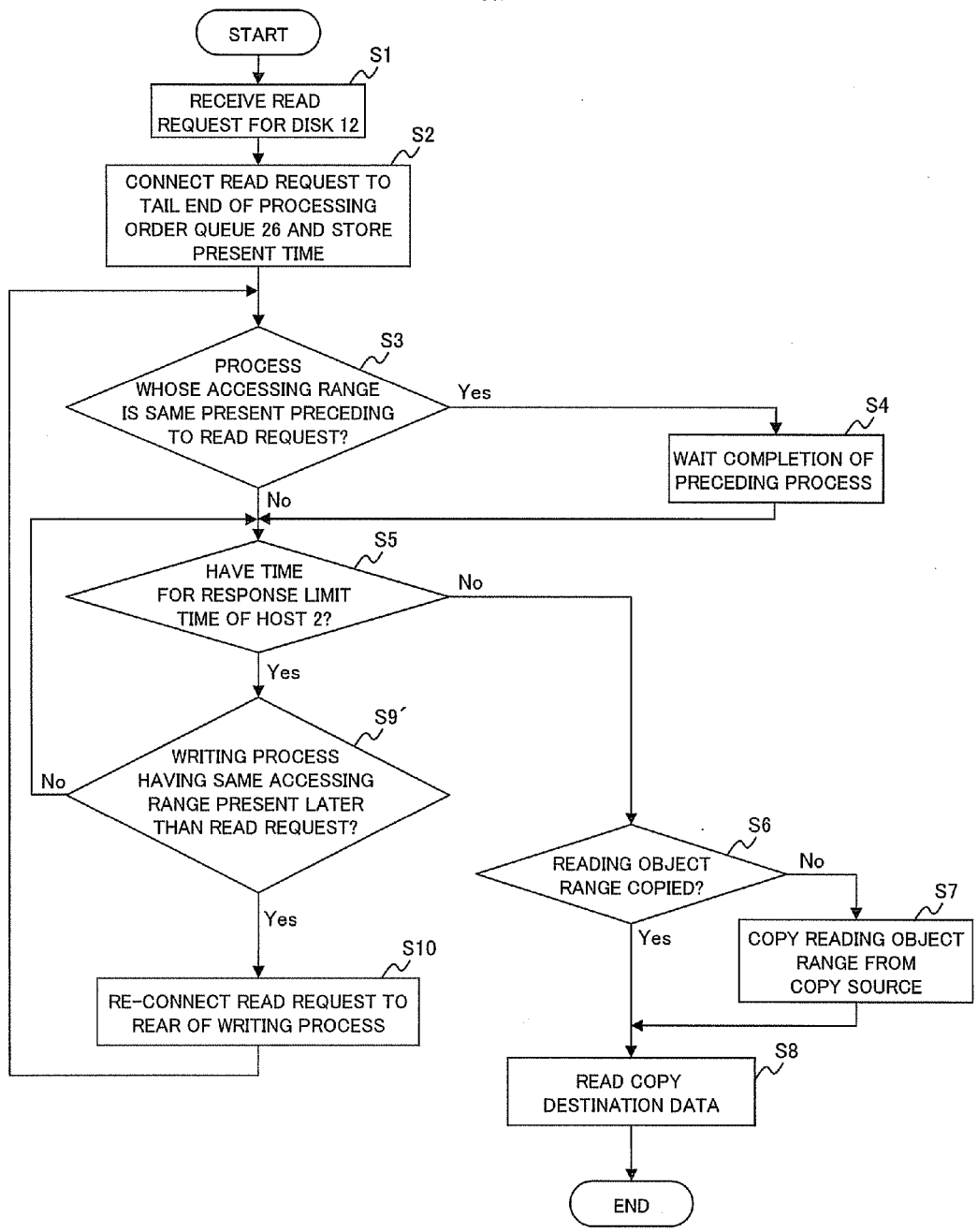
FIG. 7 is a flow chart illustrating an example of an operation procedure of a storage section controlling system as a modification.
Figure 8:
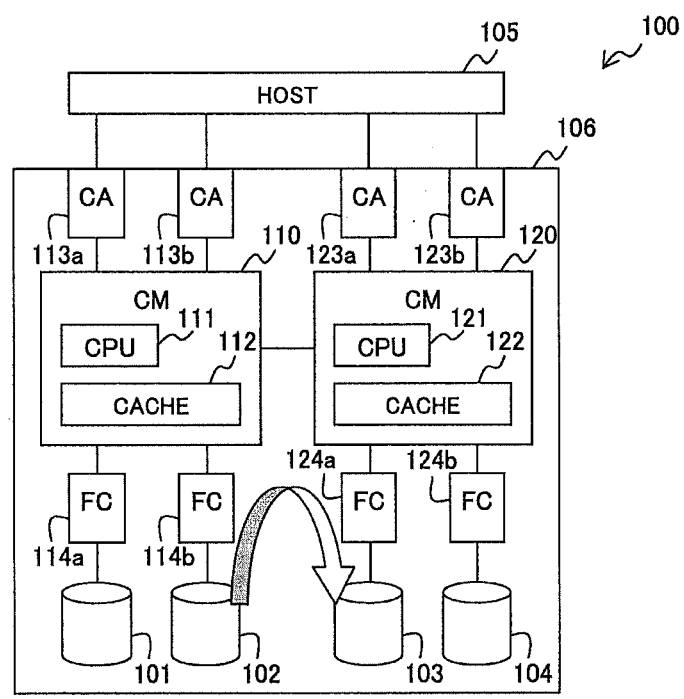
FIG. 8 is a block diagram illustrating a configuration of a conventional storage section controlling system.

Further, while the embodiment described hereinabove is configured such that, if there exists no corresponding writing process (updating process of source data) having the same accessing range later than a readout request for the disk 12 in the processing order queue 26 as seen from step S9 of the flow chart in FIG. 6 (No route at step S9), then the processing advances to step S6 so that the second processing section 35 executes the readout request, the present invention is not limited to this. For example, such a configuration as illustrated in FIG. 7 may be adopted such that, if there exists no corresponding writing process later than the readout request in the decision at step S9' (No route at step S9'), then the processing returns to step S5 such that execution of the readout request is waited so far as time permits within a range within which the host 2 does not detect timeout and then, if the corresponding writing process (in other words, updating process of the source data) is registered into the processing order queue 26 during the waiting, then it is decided whether or not the processing turn of the readout request in the processing order can be changed so as to be later than the writing process (in other words, the processing at step S9' is carried out). Consequently, the latest data as far as possible can be used with certainty in accordance with the readout request within a range within which timeout is not detected by the host 2.

It is to be noted that the functions as the duplexing controlling section 25, processing order controlling section 27, first processing section 28 and second processing section 35 described above may be implemented by a computer (including a CPU, an information processing apparatus and various terminals) executing a predetermined application program (storage section controlling program).

The program is provided in a form in which it is recorded on a computer-readable recording medium such as, for example, a flexible disk, a CD (a CD-ROM, a CD-R, a CD-RW or the like), a DVD (a DVD-ROM, a DVD-RAM, a DVD-R, a DVD-RW, a DVD+R, a DVD+RW or the like). In this instance, the computer reads out the storage section controlling program from the recording medium and transfers and stores the program into an internal storage apparatus or an external storage apparatus and then uses the program. Further, the program may be recorded, for example, on or in a storage apparatus (recording medium) such as a magnetic disk, an optical disk or a magneto-optical disk in advance and is provided from the storage apparatus to the computer through a communication line.

Here, the computer is a general concept including hardware and an OS (operating system) and signifies the hardware which operates under the control of the OS. Further, where an OS is unnecessary and hardware is operated solely by an application program, the hardware itself corresponds to the computer. The hardware includes at least a microprocessor such as a CPU and means for reading out a computer program recorded on or in a recording medium.

An application program as the storage section controlling program includes program codes for causing such a computer as described above to implement the functions as the duplexing controlling section 25, processing order controlling section 27, first processing section 28 and second processing section 35. Further, some of the functions may be implemented not by the application program but by the OS.

It is to be noted that, as a recording medium as the present embodiment, not only a flexible disk, a CD, a DVD, a magnetic disk, an optical disk and a magneto-optical disk but also various computer-readable media such as an IC card, a ROM cartridge, a magnetic tape, a punched card, an internal storage apparatus (memory such as a RAM or a ROM) of a computer and an external storage apparatus or the like can be utilized.

In this manner, with the present invention, if a readout request for a target region of a duplexing process by the duplexing controlling section of the second storage section is issued from a data processing apparatus and a writing request for a target region of the first storage section corresponding to the target region of the readout request exists later than a processing turn of the readout request in a processing order in the queuing section, then the processing order controlling section changes the processing turn of the readout request in the processing order in the queuing section so as to be later than the writing request. Therefore, if the source data in the first storage section of data according to the readout request issued from the data processing apparatus is scheduled to be updated, then processing for the readout request can be carried out using data after the updating and a response can be issued for a readout request from the data processing apparatus normally using the latest data.

Further, if a predetermined time period has not passed after the readout request is retained into the queuing section, then since the processing order controlling section changes the processing turn of the readout request in the processing order so as to be later than the corresponding writing request, detection of timeout with regard to the readout request by the data processing apparatus can be suppressed.

Further, if a duplexing process of data in a target region according to the readout request by the duplexing controlling section is not completed as yet when the readout request is executed based on the processing order retained in the queuing section, then the processing section causes the duplexing controlling section to copy data in the target region from the first storage section into the second storage section to execute the readout request. Therefore, even if a readout request is issued for a region whose duplexing between the first storage section and the second storage section is not completed after an instruction for duplexing is received from the data processing apparatus by the duplexing controlling section, the readout request can be executed with certainty.

It is to be noted that, since the processing section decides based on the management table whether or not a duplexing process of data in the target region according to the readout request is completed, it can be decided with certainty whether or not data according to the readout request is stored in the second storage section (in other words, whether or not the data is duplexed), and as a result, the readout request can be executed with a higher degree of certainty.

Further, after transition of data of the first storage section into a duplexed state is completed, every time data in a duplexing target region (predetermined storage region) of the first storage section is updated, the duplexing controlling section copies the updated data into the second storage section to maintain the duplexed state, and therefore, duplexing of data between the first storage section and the second storage section can normally be maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A storage section controlling apparatus included in a storage section controlling system including plural storage sections that include a first storage section and a second storage section and store data, at least one data processing apparatus that carries out processing for the data stored in said plural storage sections, the storage section controlling apparatus that is interposed between the first storage section and the data processing apparatus for carrying out processing for the first storage section in response to a processing request from the data processing apparatus, and another storage section controlling apparatus that is interposed between the second storage section and the data processing apparatus for carrying out processing for the second storage section in response to a processing request from the data processing apparatus, the storage section controlling apparatus comprising:
   a duplexing controlling section adapted to copy data in a predetermined storage region of the first storage section into the second storage section to maintain the data in the predetermined storage region in a duplexed state;
   a queuing section adapted to collectively retain a processing order of write requests and readout requests to the first storage section from the data processing apparatus and readout requests to the second storage section issued from the data processing apparatus to the another storage section controlling apparatus; and
   a processing order controlling section adapted to change, where a readout request for a region of the second storage section which is a target of a duplexing process by said duplexing controlling section is issued from the data processing apparatus and the processing order in said queuing section includes, later than a processing turn of the readout request, a write request for a target region of the first storage section which corresponds to the target region of the readout request, the processing turn of the readout request in the processing order of said queuing section so as to be later than the write request in the processing order.

2. The storage section controlling apparatus as claimed in claim 1, wherein said processing order controlling section changes, if a predetermined time period has not passed after the readout request is retained by said queuing section, the processing turn of the readout request in the processing order so as to be later than the corresponding write request.

3. The storage section controlling apparatus as claimed in claim 1, further comprising a management table adapted to manage a progress situation of the duplexing process by said duplexing controlling section in an associated relationship with storage regions of the second storage section; and wherein
   the another storage section controlling apparatus decides based on said management table whether or not the duplexing process for the data in the target region according to the readout request is completed.

4. The storage section controlling apparatus as claimed in claim 1, wherein, after transition of the data in the predetermined storage region of the first storage section into a duplexed state is completed, every time the data in the predetermined storage region of the first storage section is updated, said duplexing controlling section copies the updated data into the second storage section to maintain the duplexed state.

5. A storage section controlling system, comprising:
   plural storage sections including a first storage section and a second storage section, adapted to store data;
   at least one data processing apparatus adapted to carry out processing for the data stored in said plural storage sections;
   a first storage section controlling apparatus interposed between the first storage section and said data processing apparatus and adapted to carry out processing for the first storage section in response to a processing request from said data processing apparatus; and
   a second storage section controlling apparatus interposed between the second storage section and said data processing apparatus and adapted to carry out processing for the second storage section in response to a processing request from said data processing section; and wherein
   said first storage section controlling apparatus includes:

a duplexing controlling section adapted to copy data in a predetermined storage region of the first storage section into the second storage section to maintain the data in the predetermined storage region in a duplexed state;

a queuing section adapted to collectively retain a processing order of write requests and data readout requests to the first storage section from the data processing apparatus and readout requests to the second storage section issued from said data processing apparatus to the another storage section controlling apparatus; and a processing order controlling section adapted to change, where a readout request for a region of the second storage section which is a target of a duplexing process by said duplexing controlling section is issued from the data processing apparatus and the processing order in said queuing section includes, later than a processing turn of the readout request, a write request for a target region of the first storage section which corresponds to the target region of the readout request, the processing turn of the readout request in the processing order of said queuing section so as to be later than the write request in the processing order.

6. The storage section controlling system as claimed in claim 5, wherein said second storage section controlling apparatus includes a processing section adapted to, when the readout request is to be executed based on the processing order retained by said queuing section, if the duplexing process for data in the target region according to the readout request by said duplexing controlling section is not completed as yet, cause said duplexing controlling section to copy the data in the target region from the first storage section into the second storage section and then execute the readout request; otherwise, if the duplexing process for the data in the target region according to the readout request by said duplexing controlling section is completed, execute the readout request.

7. The storage section controlling system as claimed in claim 6, further comprising a management table adapted to manage a progress situation of the duplexing process by said duplexing controlling section in an associated relationship with storage regions of the second storage section; and wherein said processing section decides based on said management table whether or not the duplexing process for the data in the target region according to the readout request is completed.

8. The storage section controlling system as claimed in claim 5, wherein said processing order controlling section changes, if a predetermined time period has not passed after the readout request is retained by said queuing section, the processing turn of the readout request in the processing order so as to be later than the corresponding write request.

9. The storage section controlling system as claimed in claim 5, wherein, after transition of the data in the predetermined storage region of the first storage section into a duplexed state is completed, every time the data in the predetermined storage region of the first storage section is updated, said duplexing controlling section copies the updated data into the second storage section to maintain the duplexed state.

10. A non-transitory computer-readable recording medium on or in which a storage section controlling program for causing a computer to implement a function for executing a readout request for data of a duplexing object in a storage section controlling system including plural storage sections including a first storage section and a second storage section, adapted to store data, at least one data processing apparatus adapted to carry out processing for the data stored in the plural storage sections, a first storage section controlling apparatus interposed between the first storage section and the data processing apparatus and including a queuing section adapted to retain a processing order of write requests and readout requests for the plural storage sections from the data processing apparatus, the first storage section controlling apparatus carrying out processing for the first storage section in response to a processing request from the data processing apparatus, and a second storage section controlling apparatus interposed between the second storage section and the data processing apparatus so as to carry out processing for the second storage section in response to a processing request from the data processing apparatus, is recorded, the storage section controlling program causing the computer to function such that the first storage section controlling apparatus functions as:

a duplexing controlling section adapted to copy data in a predetermined storage region of the first storage section into the second storage section to maintain the data in the predetermined storage region in a duplexed state; and a processing order controlling section adapted to change, where a readout request for a region of the second storage section which is a target of a duplexing process by the duplexing controlling section is issued from the data processing apparatus, and where the processing order in the queuing section, the queuing section collectively retains the processing order of write requests and readout requests to the first storage section from the data processing apparatus and readout requests to the second storage section issued from the data processing apparatus to the another storage section controlling apparatus, the processing order includes, later than a processing turn of the readout request, a write request for a target region of the at least one first storage section which corresponds to the target region of the readout request, the processing turn of the readout request in the processing order of the queuing section so as to be later than the write request in the processing order.

11. The non-transitory computer-readable recording medium on or in which the storage section controlling program is recorded as claimed in claim 10, wherein the storage section controlling program causes the computer to further function such that the second storage section controlling apparatus functions as a processing section adapted to, when the readout request is to be executed based on the processing order retained by the queuing section, if the duplexing process for data in the target region according to the readout request by the duplexing controlling section is not completed as yet, cause the duplexing controlling section to copy the data in the target region from the first storage section into the second storage section and then execute the readout request; otherwise, if the duplexing process for the data in the target region according to the readout request by the duplexing controlling section is completed, execute the readout request.

12. The non-transitory computer-readable recording medium on or in which the storage section controlling program is recorded as claimed in claim 11, wherein the first storage section controlling program causes the computer to further function such that the first storage section controlling apparatus further includes a management table adapted to manage a progress situation of the duplexing process by the duplexing controlling section in an associated relationship with storage regions of the second storage section and the processing section decides based on the management table whether or not the duplexing process for the data in the target region according to the readout request is completed.

13. The non-transitory computer-readable recording medium on or in which the storage section controlling program is recorded as claimed in claim 10, wherein the storage section controlling program causes the computer to further function such that the processing order controlling section changes, if a predetermined time period has not passed after the readout request is retained by the queuing section, the processing turn of the readout request in the processing order so as to be later than the corresponding write request.

14. The non-transitory computer-readable recording medium on or in which the storage section controlling program is recorded as claimed in claim 10, wherein the storage section controlling program causes the computer to further function such that, after transition of the data in the predetermined storage region of the first storage section into a duplexed state is completed, every time the data in the predetermined storage region of the first storage section is updated, the duplexing controlling section copies the updated data into the second storage section to maintain the duplexed state.

\* \* \* \* \*